United States Patent
Kohara et al.

(10) Patent No.: US 7,999,235 B2
(45) Date of Patent: Aug. 16, 2011

(54) NUCLEAR MEDICINE DIAGNOSIS APPARATUS

(75) Inventors: Ryota Kohara, Tokyo (JP); Takashi Shirahata, Tokyo (JP); Tetsuo Nakazawa, Tokyo (JP); Osamu Miyazaki, Tokyo (JP)

(73) Assignee: Hitachi Medical Corporation, Tokyo (JP)

( * ) Notice: Subject to any disclaimer, the term of this patent is extended or adjusted under 35 U.S.C. 154(b) by 159 days.

(21) Appl. No.: 12/442,149

(22) PCT Filed: Sep. 19, 2007

(86) PCT No.: PCT/JP2007/068179
§ 371 (c)(1),
(2), (4) Date: Mar. 20, 2009

(87) PCT Pub. No.: WO2008/035708
PCT Pub. Date: Mar. 27, 2008

(65) Prior Publication Data
US 2010/0019156 A1    Jan. 28, 2010

(30) Foreign Application Priority Data
Sep. 21, 2006 (JP) .................................. 2006-255161

(51) Int. Cl.
*G01T 1/161* (2006.01)
(52) U.S. Cl. .................................................. 250/363.1
(58) Field of Classification Search ............... 250/363.1
See application file for complete search history.

(56) References Cited

U.S. PATENT DOCUMENTS

| | | | |
|---|---|---|---|
| 5,841,140 A * | 11/1998 | McCroskey et al. | 250/363.03 |
| 6,175,116 B1 * | 1/2001 | Gagnon et al. | 250/363.03 |
| 6,512,232 B2 * | 1/2003 | Pehl et al. | 250/369 |
| 6,881,959 B2 * | 4/2005 | Meng et al. | 250/363.1 |

FOREIGN PATENT DOCUMENTS

| | | |
|---|---|---|
| JP | 63-158490 | 7/1988 |
| JP | 06-201832 | 7/1994 |
| JP | 2000-019254 | 1/2000 |

* cited by examiner

*Primary Examiner* — Constantine Hannaher
(74) *Attorney, Agent, or Firm* — Antonelli, Terry, Stout & Kraus, LLP.

(57) ABSTRACT

A nuclear medicine diagnosis apparatus comprising a mechanical collimator for effecting passage in a given direction of photons with given energy emitted from an object injected or dosed with a drug containing a radioactive isotope; a former-stage detector for detecting positional information at a point of reaction of photons having passed through the mechanical collimator and information on the momentum of charged particles generated by the reaction; a latter-stage detector disposed in the subsequent stage of the former-stage detector to detect information on the photons having been scattered by the former-stage detector; and image reconstruction means for reconstructing an image from detection information having been collected from the former-stage detector and latter-stage detector, wherein the image reconstruction means is built so that differentiation is carried out on the information on the photons having passed through the mechanical collimator and the information on the photons having been scattered by the former-stage detector and that the image reconstruction is carried out by different image reconstruction algorithms from the individual differentiated detection information.

4 Claims, 12 Drawing Sheets

NUCLEAR MEDICINE DIAGNOSIS APPARATUS

TECHNICAL FIELD

The present invention relates to a nuclear medicine diagnosis apparatus for imaging spatial distribution of photon source such as a gamma-ray source in the body of an object using a Compton camera.

BACKGROUND ART

A nuclear medicine diagnosis apparatus using a Compton camera has been garnering attention recently because it has a variety of advantages compared to the other nuclear medicine diagnosis apparatuses.

A Compton camera is basically configured by combination of a former-stage detector and a latter-stage detector. A former-stage detector causes an incoming gamma ray (photon) from an object Compton scattering (hereinafter sometimes referred to as a reaction) which generates a recoil electron and a scattered gamma ray. The generated recoil electron is detected by the former-stage detector and the generated scattered gamma ray is detected by the latter-stage.

Since the energy and direction of the incoming gamma ray can be uniquely determined by the detected information, the spatial distribution of the gamma ray source can be imaged by the image reconstruction technique.

The detail of the Compton camera is disclosed in Patent Document 1 below. In the case of acquiring a diagnostic image of an object using such Compton camera, the images are usually constructed using so-called Compton camera reconstruction algorithm wherein the detection result of gamma rays using the Compton scattering is taken into consideration.

Patent Document 1: JP-A-S63-158490

DISCLOSURE OF THE INVENTION

Problem to be Solved

However, the surface imagery of an image is created by the Compton camera reconstruction algorithm and depends on energy of the incoming gamma rays, which leaves an unsolved problem of difficulty in acquiring a uniform and high-definition image due to the uneven energy amount.

The objective of the present invention is to provide a nuclear medicine diagnosis apparatus capable of acquiring a uniform and high-definition image over a wide range regardless of energy amount of the detected photons.

Means to Solve the Problem

The nuclear medicine diagnostic apparatus of the present invention comprises:

a mechanical collimator for having photons of a predetermined energy emitted from an object injected and dosed with a drug containing radioactive isotopes pass through in a predetermined direction;

a former-stage detector for detecting positional information at a reaction point of photons having passed through the mechanism collimator and information on the momentum of charged particles generated by the reaction;

a latter-stage detector disposed in a subsequent stage of the former-stage detector to detect information on the photons having been scattered by the former-stage detector; and image reconstruction means for reconstructing an image from detection information having been collected from the former-stage detector and the latter-stage detector, wherein the image reconstruction means is configured to differentiate information on the photons having been passed through the mechanical collimator and information on the photons having been scattered by the former-stage detector, and perform image reconstruction by different image reconstruction algorithms from each of the individual differentiated detection information.

Effect of the Invention

In accordance with the present invention, it is possible to provide a nuclear medicine diagnosis apparatus capable of acquiring a uniform and high-definition image over a wide range regardless of energy amount of the detected photons.

DESCRIPTION OF REFERENCE NUMERALS

100: first detection means, 100': second detection means, 101 and 101': mechanical collimator, 102 and 102': former-stage detector, 103 and 103': latter-stage detector, 110A: information collecting device, 110B: image reconstruction device, 120: display device, 130: image, 140: accumulated radioactive drug, 150: object, 131a, 131b, ..., 131n: image, 133p: image

BEST MODE FOR CARRYING OUT THE INVENTION

Hereinafter, preferable embodiments of the present invention will be described using the attached diagrams. In all of the diagrams for explaining embodiments of the present invention, the same symbols are appended to the places having the same function and the repeated explanation thereof will be omitted.

Figure 1:
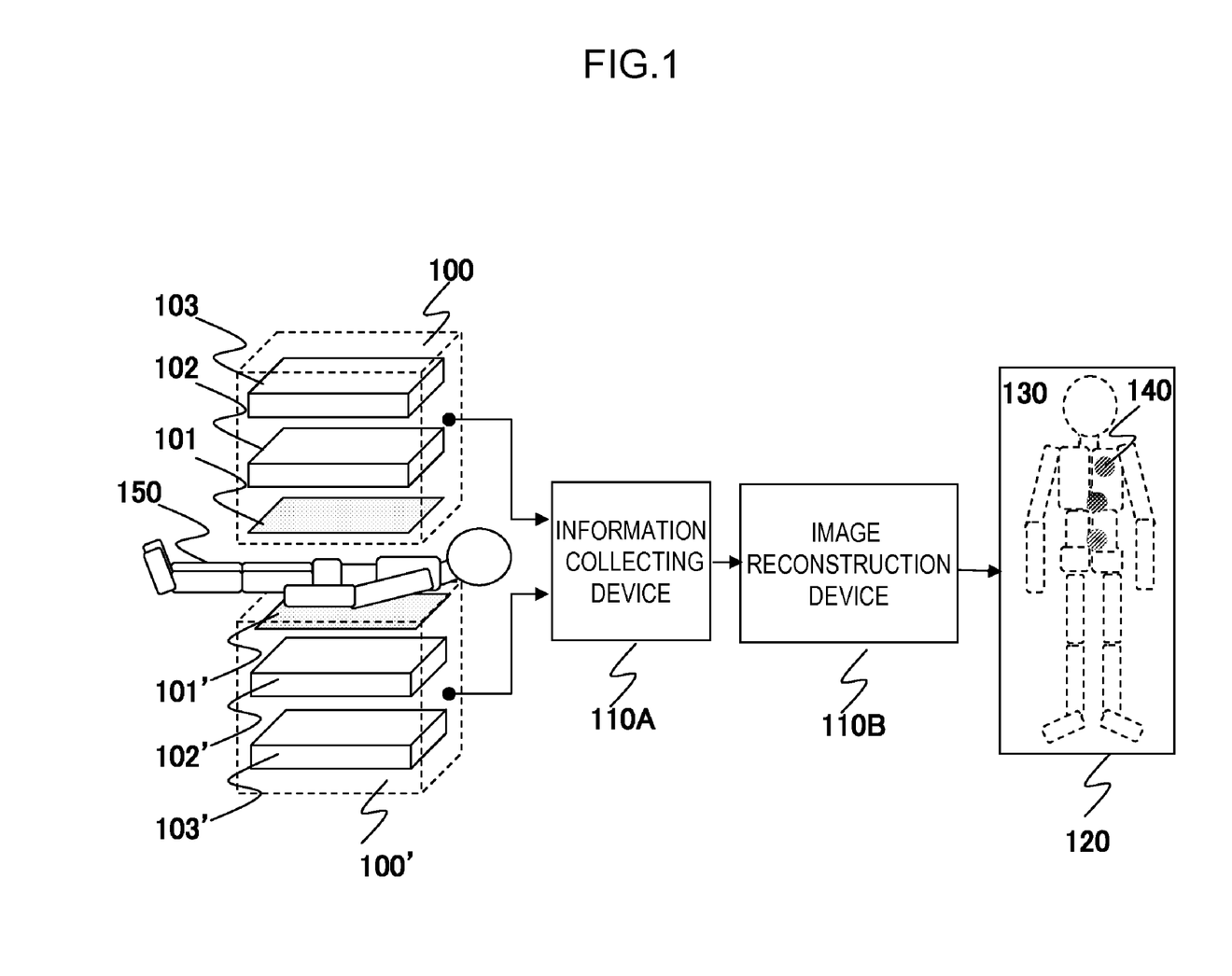
FIG. 1 is a schematic configuration diagram showing an embodiment of the nuclear medicine diagnosis apparatus related to the present invention.

FIG. 1 is a schematic configuration diagram showing an embodiment of the nuclear medicine diagnosis apparatus related to the present invention.

In FIG. 1, a first detection means 100 and a second detection means 100' are disposed facing each other having a space therebetween. Between these first detection means 100 and second detection means 100', an object 150 injected with radioactive drug is to be placed, for example, being laid down.

The first detection means 100 is configured having a mechanical collimator 101, a former-stage detector 102 and a latter-stage detector 103 placed in order from the side of the object 150 toward the outside. The detector configured by the combination of the former-stage detector 102 and latter-stage detector 103 is referred to as a Compton camera, and the first detection means 100 is a device having the mechanical collimator 101 ahead of the Compton camera.

In the same manner, the second detection means 100' is configured having a mechanical collimator 101', a former-stage detector 102' and a latter-stage detector 103' placed in order from the side of the object 150 toward the outside. The detector configured by the combination of the former-stage detector 102' and the latter-stage detector 103' is referred to as a Compton camera, and the second detection means 100' is a device having the mechanical collimator 101' ahead of the Compton camera.

The mechanical collimator 101', former-stage detector 102' and latter-stage detector 103' have the same configuration as the mechanical collimator 101, former-stage detector 102 and the latter-stage detector 103 respectively.

Thus the configuration of the mechanical collimator 101, former-stage detector 102 and latter-stage detector 103 will be described below.

The mechanical collimator 101 is formed having numerous pinhole-like through-holes over nearly the entire region on the main surface of, for example, a board made of lead. Then the mechanical collimator 101 is configured so that the photons emitted from the object 150 are passed only through the through-holes to the side of the former-stage detector 102 when the photons have low energy, and that the photons are permeated through the mechanical collimator 101 itself to the side of the former-stage detector 102 regardless of the existence of through-holes when the photons have high energy.

The respective through-holes of the mechanical collimator 101 are formed having a predetermined angle with respect to the main surface of the mechanical collimator 101, that is, formed being pointed to a predetermined direction. Thus the photons of low energy which permeated these through-holes are to be incident to the side of former-stage detector 102 through the path along the pointed direction.

Accordingly, the mechanical collimator 101 is configured so that the photons emitted from the object 150 are permeated when they have high energy, and are passed through to a predetermined direction when they have low energy.

In the former-stage detector 102, the first Compton scattering (reaction) is caused when the incoming photons permeate or pass through the mechanical collimator 101, the scattered photons are scattered from the Compton scattering point to the latter-stage detector 103 and at the same time recoil electrons are generated. The former-stage detector 102 detects the positional information of the Compton scattering point or information on the momentum of the recoil electrons, and the detected signals are to be inputted to an information collecting device 110A to be described later.

Also, the latter-stage detector 103 receives the scattered photons scattered in the former-stage detector 102 and detects information on the momentum of the scattered photons, and the detected signals are to be inputted to the information collection device 110A to be described later.

The above-described operation of the former-stage detector 102 and the latter-stage detector 103 is for the case that the incoming gamma rays have high energy and the former-stage detector 102 and the latter-stage detector 103 function as a Compton camera. However, in the present embodiment as to be described later in FIG. 2, the detectors can function as a PET device (positron tomograph) when the incoming gamma rays have medium energy, and as a gamma camera when the incoming gamma rays have low energy.

The detection information thus obtained by the first detection means 100 and a second detection means 100' are collected by the information collecting device 110A, and image information is to be created by an image reconstruction device 110B.

The image reconstruction device 110B is configured to perform different image reconstructions in accordance with the low, medium and high energy amount levels of gamma rays detected by the first detection means 100 and the second detection means 100' as to be described later in FIG. 2. Then the image information from the image reconstruction device 110B is to be inputted to a display device 120, and aforementioned image 130 is to be displayed on the display screen of the display device 120. The image 130 is an image of the object 150, and a radioactive drug 140 accumulated preferentially is to be imaged and displayed.

Figure 2:
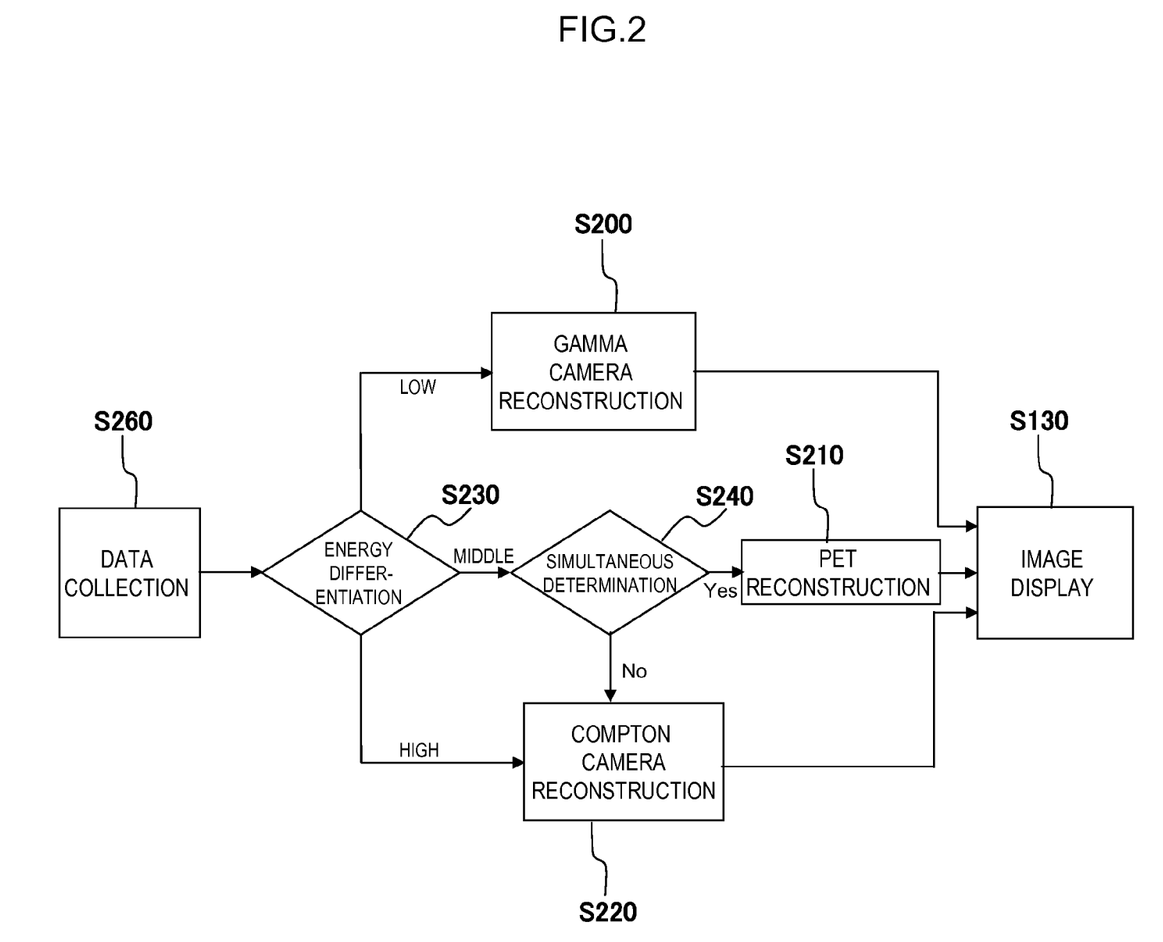
FIG. 2 is a flowchart showing a procedure to acquire a diagnostic image based on the detection information obtained from a first detection means and a second detection means shown in FIG. 1.

FIG. 2 shows the operation of the information collecting device 110A and the image reconstruction device 110B, and an explanatory diagram showing the flow of acquisition of a diagnostic image based on the detection information obtained from the first detection means 100 and the second detection means 100'.

In FIG. 2, the detection information is collected first in step S260. Then the detection information is differentiated in step S230 based on the energy amount of the gamma rays detected by the first detection means 100 and the second detection means 100'.

By the differentiation of energy, the incident direction of the gamma rays can be specified in accordance with the energy amount.

More specifically, when the gamma rays emitted from the object 150 have low energy, ideally the gamma rays are to be absorbed in the former-stage detector 102 or the latter-stage detector 103 only through the through-holes of the mechanical collimator 101 in the first detection means 100, and absorbed in the former-stage detector 102' or the latter-stage detector 103' only through the through-holes of the mechanical collimator 101' in the second detection means 100', for the first detection means 100 and the second detection means 100' to obtain the detection information based on the gamma rays. The detection information based on this case of gamma rays include information on the incident direction of the gamma rays thereof along the direction of the through-holes of the mechanical collimator 101 (101').

Also, when the gamma rays emitted from the object 150 have high energy, the gamma rays are to permeate the mechanical collimator 101 of the first detection means 100, cause Compton scattering in the former-stage detector 102 then are to be absorbed in the latter-stage detector 103, and to permeate the mechanical collimator 101' of the second detection means 100', cause Compton scattering in the former-stage detector 102' then are to be absorbed in the latter-stage detector 103'. Accordingly, the first detection means 100 and the second detection means 100' can acquire detection information based on the gamma rays. The detection information based on this case of gamma rays includes information of the scattering direction after the Compton scattering of the gamma rays.

Further, when the gamma rays emitted from the object 150 have middle energy, the gamma rays are to permeate the mechanical collimator 101 of the first detection means 100 and to be absorbed in the former-stage detector 102 or the latter-stage detector 103. At this time, sometimes they simultaneously pass through the mechanical collimator 101' of the first detection means 100' and get absorbed in the former-stage detector 102' or the latter-stage detector 103'. Accordingly, the first detection means 100 and the second detection means 100' can acquire detection information based on the gamma rays. The detection information based on this case of gamma rays includes the information on the direction which connects the absorption places of the respective gamma rays in the first detection means 100 and the second detection means 100'.

In addition, even when the gamma rays emitted from the object 150 have mid-level energy and have not been detected simultaneously by the first detector 100 and the second detector 100', it is set so that the same processing is to be performed as for detecting high-energy gamma rays.

Detection information in the case of low energy is to be performed with the image reconstruction in step S200 by, for example, the gamma camera reconstruction. Image reconstruction by the gamma-ray camera reconstruction is suitable for the gamma rays wherein the incident direction is determined by passing through the mechanical collimator 101. In this manner, it is possible to reconstruct high-definition images based on the detection information from gamma rays having low energy.

Also, the image reconstruction by the detection information of gamma rays having high energy is set to be performed by the method of, for example, the Compton camera reconstruction in step 220. Image reconstruction by the Compton camera reconstruction is suitable for the gamma rays wherein a scattering angle of Compton scattering is calculated. In this manner, it is possible to reconstruct high-definition images based on the detection information from gamma rays having high energy.

Further, in the detection information having mid-level energy, when it is determined that the information is acquired by simultaneous detection by the first detection means 100 and the second detection means 100' in step S240, image reconstruction is set to be performed by, for example, the PET reconstruction method in step 210. The image reconstruction by the PET reconstruction is suitable for the gamma rays wherein the direction connecting the absorption places of the respective gamma rays is calculated. In this manner, it is possible to reconstruct high-definition images based on the detection information from the gamma rays having mid-energy.

If it is determined that the information is not acquired by the simultaneous detection by the first detection means 100 and the second detection means 100' in step S240, image reconstruction is set to be performed by the Compton camera reconstruction method in step 220.

Then the image information generated in any of the steps 200, 210 or 220 are to be transmitted to the display device for displaying images thereof in step S130. Any of these images will be displayed having the same level of high definition. Thus, image reconstruction by such method is capable of reconstructing images having uniform resolution among different energy amount.

Figure 3:
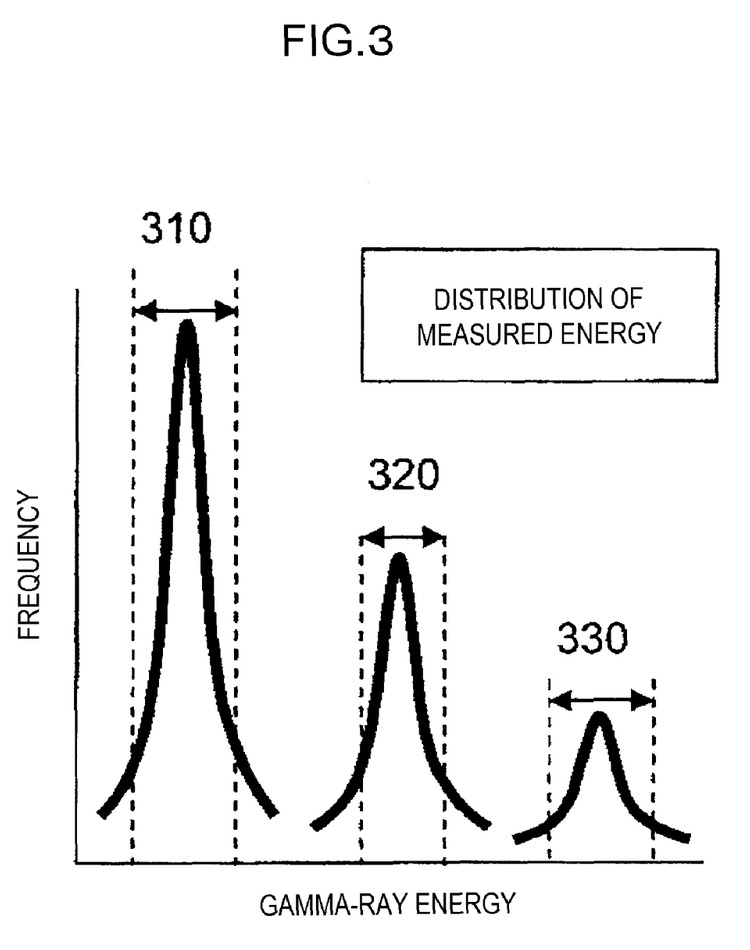
FIG. 3 is a setting example of each energy window upon performing differentiation of incoming gamma ray in step S230 of FIG. 2.

FIG. 3 is an example of setting windows for the respective energies upon performing differentiation on incident gamma rays in step S230 of FIG. 2.

In FIG. 3, an energy window 310 indicates the low-energy window provided for the peak lower than the rest mass (about 511 keV) of electrons, an energy window 320 indicates the mid-energy window provided for the peak which is the rest mass of electrons, and an energy window 330 indicates the high-energy window provided for the peak higher than the rest mass of electrons. Here, width of the respective energy windows is to be set in accordance with the energy resolution of the detection means 100(100').

The gamma rays of low-energy from the object 150 are passed through the through-holes of the mechanical collimator 101(101') and absorbed in the former-stage detector 102 (102') or the latter-stage detector 103(103'), and the detection information in these former-stage detector 102(102') or the latter-stage detector 103(103') is used for image reconstruction by the gamma camera reconstruction method. This gamma camera reconstruction method is performed, as mentioned above, by the detection information including the direction of gamma rays set by passing through the through-holes of the mechanical collimator 101 (101') based on the information of the direction. Accordingly, high-definition images can be reconstructed based on the gamma rays having low energy.

The gamma rays having medium energy from the object 150 penetrate (permeate) through the mechanical collimator 101(101') and absorbed in the former-stage detector 102(102') or the latter-stage detector 103(103'), and image reconstruction based on the detection information in these former-stage detector 102(102') or the latter-stage detector 103 (103') are performed by the PET reconstruction method. The PET reconstruction method is performed, as described above, based on the information on the direction of gamma rays included in the detection information determined by simultaneous detection by the first detection means 100 and the second detection means 100'. Accordingly, high-definition images can be reconstructed based on the detection information of the gamma rays having mid-energy.

The high-energy gamma rays from the object 150 penetrate (permeate) the mechanical collimator 101 (101'), cause reaction in the former-stage detector 102 (102') and are absorbed in the latter-stage detector 103(103'), and image reconstruction based on the detection information in these former-stage detector 102 (102') and the latter-stage detector 103(103') is performed by the Compton camera reconstruction method. The Compton camera reconstruction method is performed, as described above, based on the information on the direction of gamma rays scattered by the Compton scattering, which is acquired in the former-stage detector 102(102') and the latter-stage detector 103(103'). Accordingly, high-definition images can be constructed based on the detection information of the gamma rays having high energy.

Figure 4:
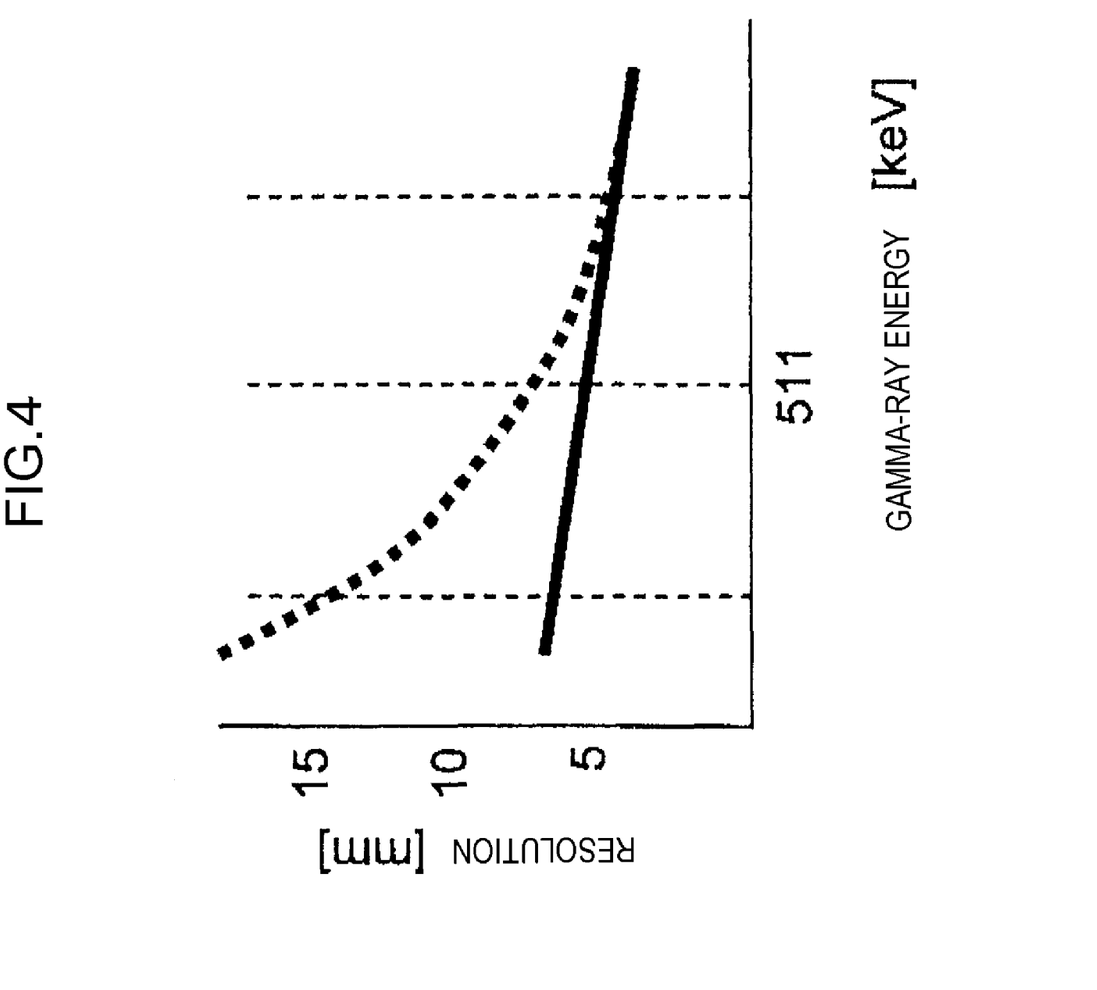
FIG. 4 is a graph showing resolution of the image acquired using different image reconstruction in accordance with the energy amount of a gamma ray.

FIG. 4 is a graph showing resolution of the image obtained by employing different image reconstruction methods in accordance with the energy amount of gamma rays as described above. In the graph of FIG. 4, the lateral axis represents energy of gamma ray (keV), the longitudinal axis represents resolution (mm), and the resolution of the image acquired by the present embodiment is represented by a solid line. As is apparent from this graph, uniform high-definition resolution can be acquired regardless of energy amount of gamma rays. In FIG. 4, the dotted line represents the resolution of the case that the image is reconstructed using only the Compton camera reconstruction without sorting the energies of incident gamma rays. It is apparent that the resolution of low-energy gamma rays is not good when an image is constructed using only the Compton camera reconstruction, and the resolution is improved in the image acquired by the present embodiment.

Figure 5:
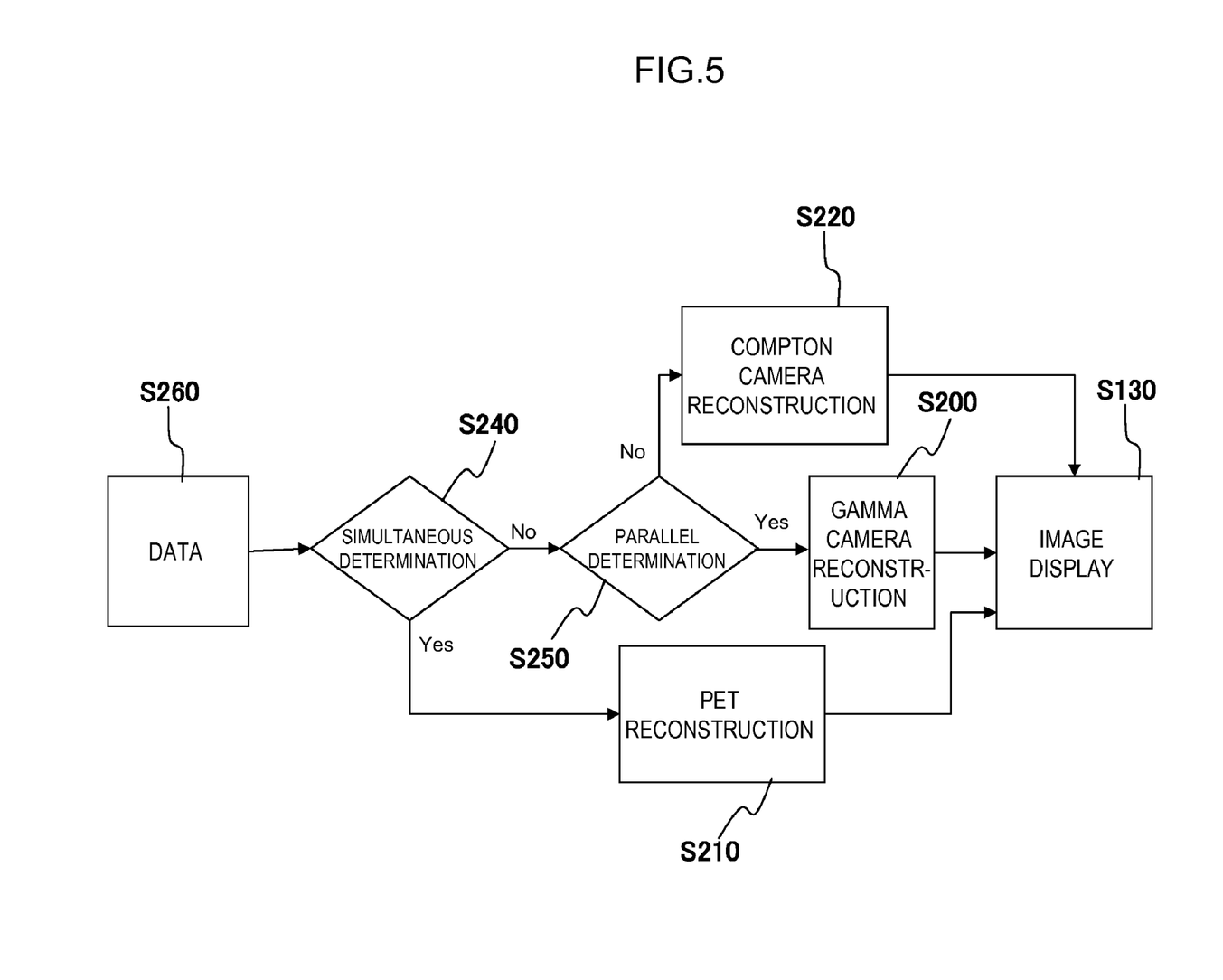
FIG. 5 is an explanatory diagram showing another embodiment of the nuclear medicine diagnosis apparatus related to the present invention, and a flowchart showing a procedure to acquire a diagnostic image based on the detection information.

FIG. 5 is an explanatory diagram showing another embodiment of the nuclear medicine diagnosis apparatus related to the present invention, corresponding to FIG. 2 showing the flow of acquisition of a diagnostic image based on the detection information.

In FIG. 5, the flow for specifying the incident direction of gamma rays is different compared to FIG. 2. In other words, in this embodiment, the acquisition of a diagnostic image is based on the detection information of the gamma rays wherein the reaction is caused in the former-stage detector 102(102') and absorbed in the latter-stage detector 103 (103'). In the detection information, information on the gamma rays which passed or permeated through the mechanical collimator 101(101') are included.

First, the incident direction of the gamma rays are calculated upon incoming of the gamma rays, based on kinematics of the Compton scattering.

Then the determination is made whether the incident direction of such calculated gamma rays matches the direction of the through-holes in the mechanical collimator 101(101') in step S250 (concordance determination).

When the incident direction of gamma rays matches or almost matches the direction of the through-holes in the mechanical collimator 101(101'), it is assumed that the incident gamma rays passed through the through-holes of the mechanical collimator 101(101'), and the gamma camera reconstruction is to be performed in step S200.

When incident direction of gamma rays does not match the direction of the through-holes, it is assumed that the incident gamma rays permeated the through-holes of the mechanical collimator 101(101'), and the Compton camera reconstruction is to be performed in step S220.

Also, when the detection information is determined in step S240 as being acquired by simultaneous detection in the first detector 100 and the second detector 100', image reconstruction is to be performed by a method such as PET reconstruction method in step 210 in the same manner as in FIG. 2.

In this embodiment, simultaneous determination (step S240) is carried out first with respect to detection information, then concordance determination (step S250) follows thereafter. However, this order does not have any crucial meaning, and the order thereof may be reversed.

Figure 6:
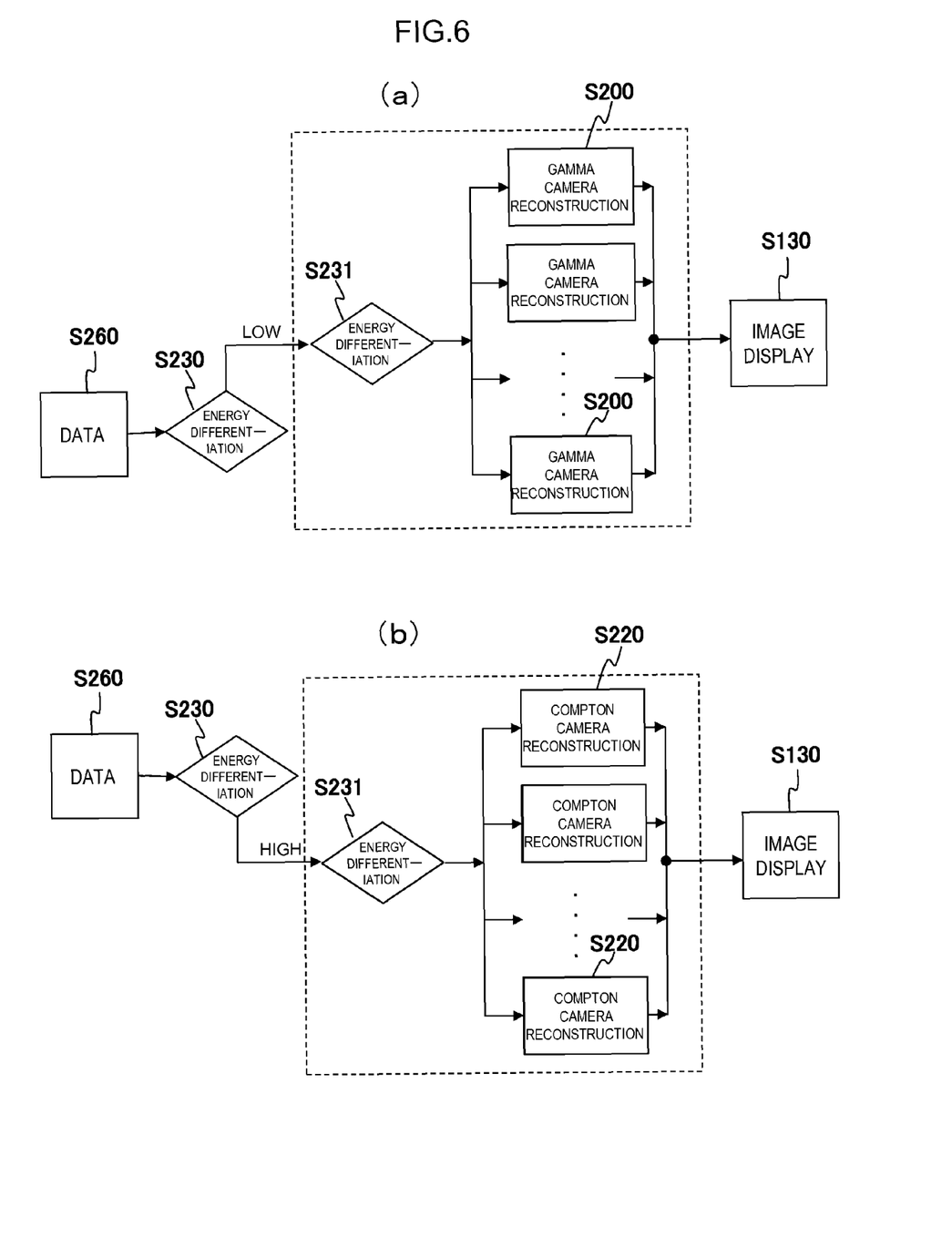
FIG. 6 shows preferable embodiments by incorporating further step of energy differentiation to the nuclear medicine diagnosis apparatus related to the above-described embodiments.

FIG. 6(*a*) and (*b*) respectively show preferable embodiments of the nuclear medicine diagnosis apparatus related to the above-described present embodiment by adding further step of energy differentiation. The part encompassed by a dotted line in FIG. 6(*a*) is equivalent, for example, to the part of the step 200 in FIG. 2, and the part encompassed by a dotted line in FIG. 6(*b*) is equivalent, for example, to the part of the step 220 in FIG. 2.

In FIG. 6(*a*), more detailed energy differentiation is carried out for the detection information from the first detection means 100 and the second detection means 100' in step S230, and for the detection information related to the low energy acquired by the previous differentiation in step s231.

Then the gamma camera reconstruction is to be performed to each of the detection information carried out with detailed energy differentiation respectively in step S200, and the obtained information by the reconstruction is to be displayed in step S130.

In this case, for example, when the radioactive drug injected into the object 150 has low energy and emits a plurality of different energies, a preferable image reconstruction can be carried out considering the energy resolution and detection efficiency of the first detection means 100 and the second detection means 100'.

In FIG. 6(*b*), more detailed energy differentiation is carried out for the detection information from the first detection means 100 and the second detection means 100' in step S230, and for the detection information related to the high energy acquired by the previous differentiation in step s231.

Then the Compton camera reconstruction is to be performed on each of the detection information carried out with detailed energy differentiation respectively in step S200, and the obtained information by the reconstruction is to be displayed in step S130.

In this case also, for example, when the radioactive drug injected into the object 150 has high energy and emit a plurality of different energies, a preferable image reconstruction can be carried out considering the energy resolution and detection efficiency of the first detection means 100 and the second detection means 100'.

The respective configuration shown in FIG. 6(*a*) and (*b*) can be incorporated respectively in the nuclear medicine diagnosis apparatus comprising the above-described configuration, or only one them may be incorporated.

Figure 7:
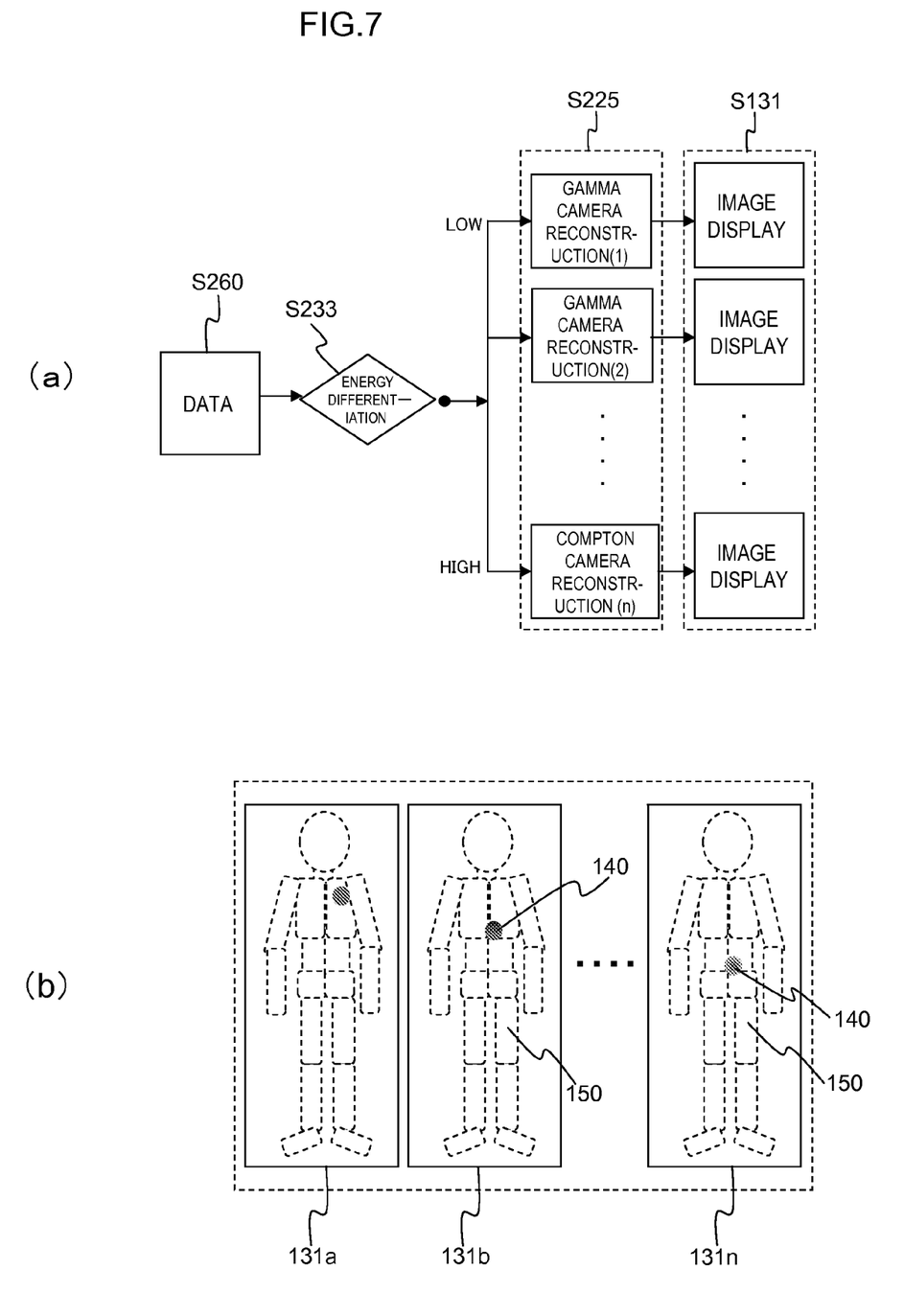
FIG. 7 shows another embodiment of the nuclear medicine diagnosis apparatus related to the present invention, and a flowchart showing a procedure to acquire a diagnostic image based on the detection information.

FIG. 7 shows another embodiment of the nuclear medicine diagnosis apparatus related to the present invention.

First, FIG. 7(*a*) is an explanatory diagram showing the flow for acquiring a diagnostic image based on the detection information obtained from the first detection means 100 and the second detection means 100'.

In FIG. 7(*a*), energy differentiation is performed on the detection information from the first detection means 100 and the second detection means 100' in step S233 to make more than 3 sets of energy. In other words, further detailed differentiation is to be performed respectively on low energy and high energy in step 233, whereby differentiating the energy into a plurality of sets of energies including the mid-energy.

Then image reconstruction is performed respectively on each set of energies in step S225 based on the detection information on each differentiated set of energy. This means that the image is constructed by the gamma camera reconstruction as mentioned above for the detection information on the low energy, by various types of gamma camera reconstruction optimally set for each set of energies which is further differentiated in detail. In concrete terms, each gamma camera reconstruction has capacity as a function considering energy resolution and detection efficiency of the first detection means 100 and the second detection means 100' in accordance with energy value.

As for the detection information of high energy, image reconstruction is performed by the Compton camera reconstruction as described above. At this time, Compton camera reconstruction is performed by various types optimally set for each set of energies which are further differentiated in details. In concrete terms, each Compton camera reconstruction has capacity as a function considering energy resolution and detection efficiency of the first detection means 100 and the second detection means 100' in accordance with energy value.

Then by the above-described respective image reconstructions, each image corresponding to the respective reconstructions is displayed in step S131.

FIG. 7(b) shows the respective images 131a, 131b, ..., 131N displayed in the step S131 in the case that a plurality of radioactive drugs are simultaneously injected into an object. The respective images 131a, 131b, ..., 131n are the images of the same object 150, and radioactive drugs 140 which emit gamma rays having different amounts of energies are displayed for each image. The difference in places where the radioactive drugs 140 are accumulated is subjected to the fact that each image is constructed in accordance with the energy value of gamma rays emitted from each radioactive drug 140.

Figure 8:
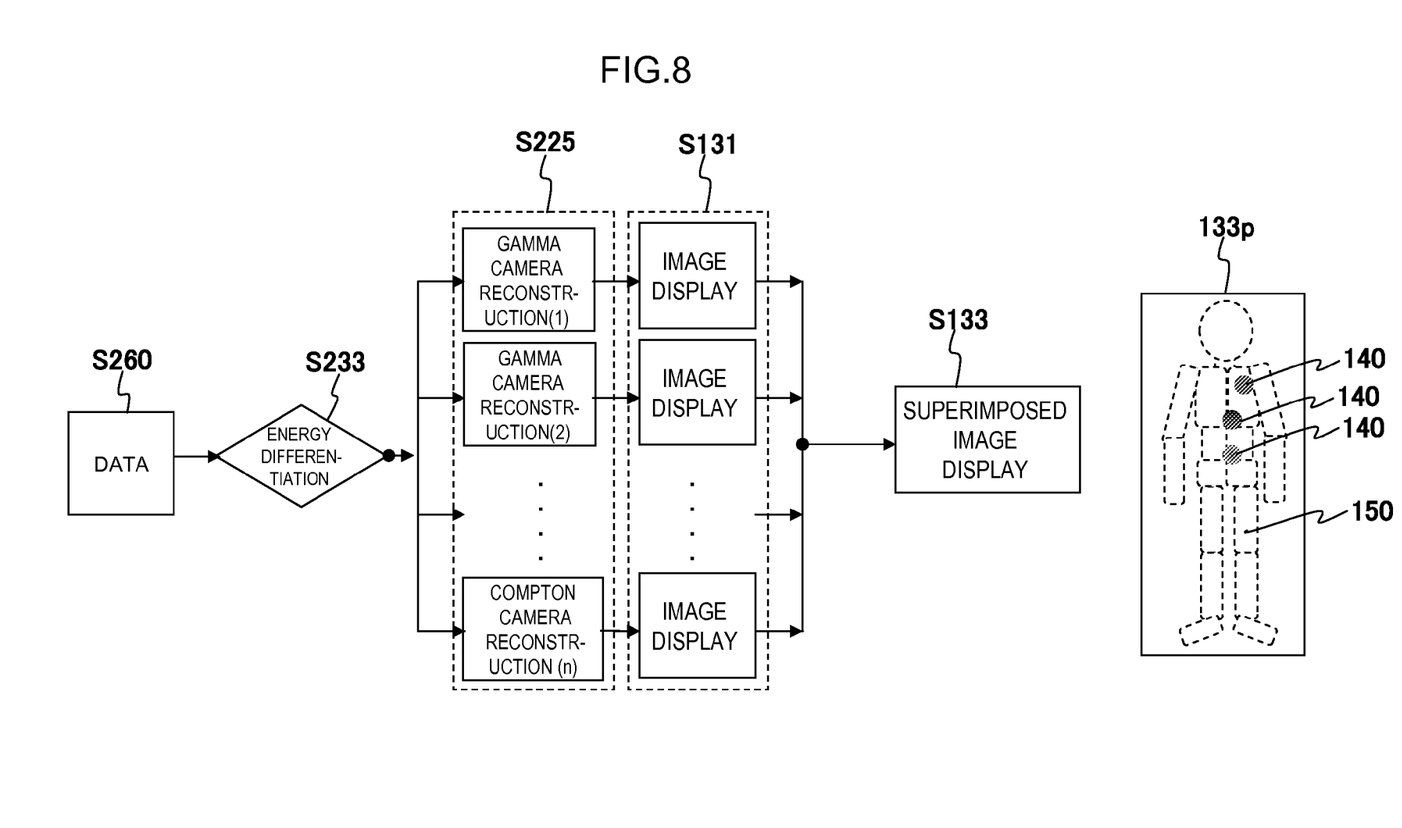
FIG. 8 shows another embodiment of the nuclear medicine diagnosis apparatus related to the present invention, and a flowchart showing a procedure to acquire a diagnostic image based on the detection information.

FIG. 8 shows a variation example of the nuclear medicine diagnosis apparatus shown in FIG. 7. FIG. 8(a) is approximately the same as the flow chart shown in FIG. 7(a) except that images acquired for each energy differentiation in step S131 are superimposed in step S133.

FIG. 8(b) shows an image 133p displayed in the step S133. The image 133p is an image of the object 150, and the radioactive drugs 140 accumulated in a plurality of regions in the object 150 are displayed. This case of display is effective in clearly articulating the positional relationship of one radioactive drug 140 to other radioactive drugs 140.

Then the energy amount of the gamma rays for each of the radioactive drugs 140 can be color displayed for better recognition.

Figure 9:
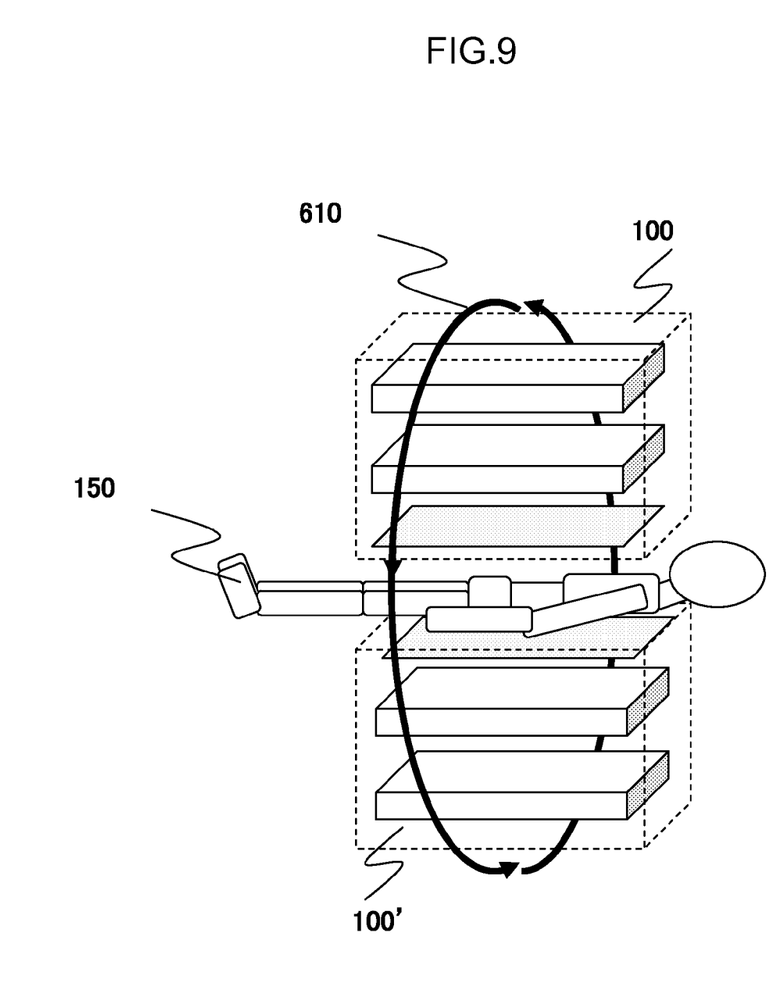
FIG. 9 is a main section configuration diagram showing another embodiment of the nuclear medicine diagnosis apparatus by the present invention.

FIG. 9 is a configuration diagram showing the main section of another embodiment of the nuclear medicine diagnosis apparatus by the present invention.

The first detection means 100 and the second detection means 100' that are placed facing each other with the object 150 therebetween are configured as capable of orbiting around the object 150 on a rotation track 610 while maintaining the facing relationship.

Collection of the detection information of gamma rays from the first detection means 100 and the second detection means 100' by the information collecting device 110A is to be performed also in the process of rotation by the first detection means 100 and the second detection means 100'.

From such obtained detection information, image information (2-dimensional image information) is created by the image reconstruction device 110B for each predetermined angle in the first detection means 100 and the second detection means 100' respectively, and 3-dimensional image information is created by combining the previously created image information.

Figure 12:
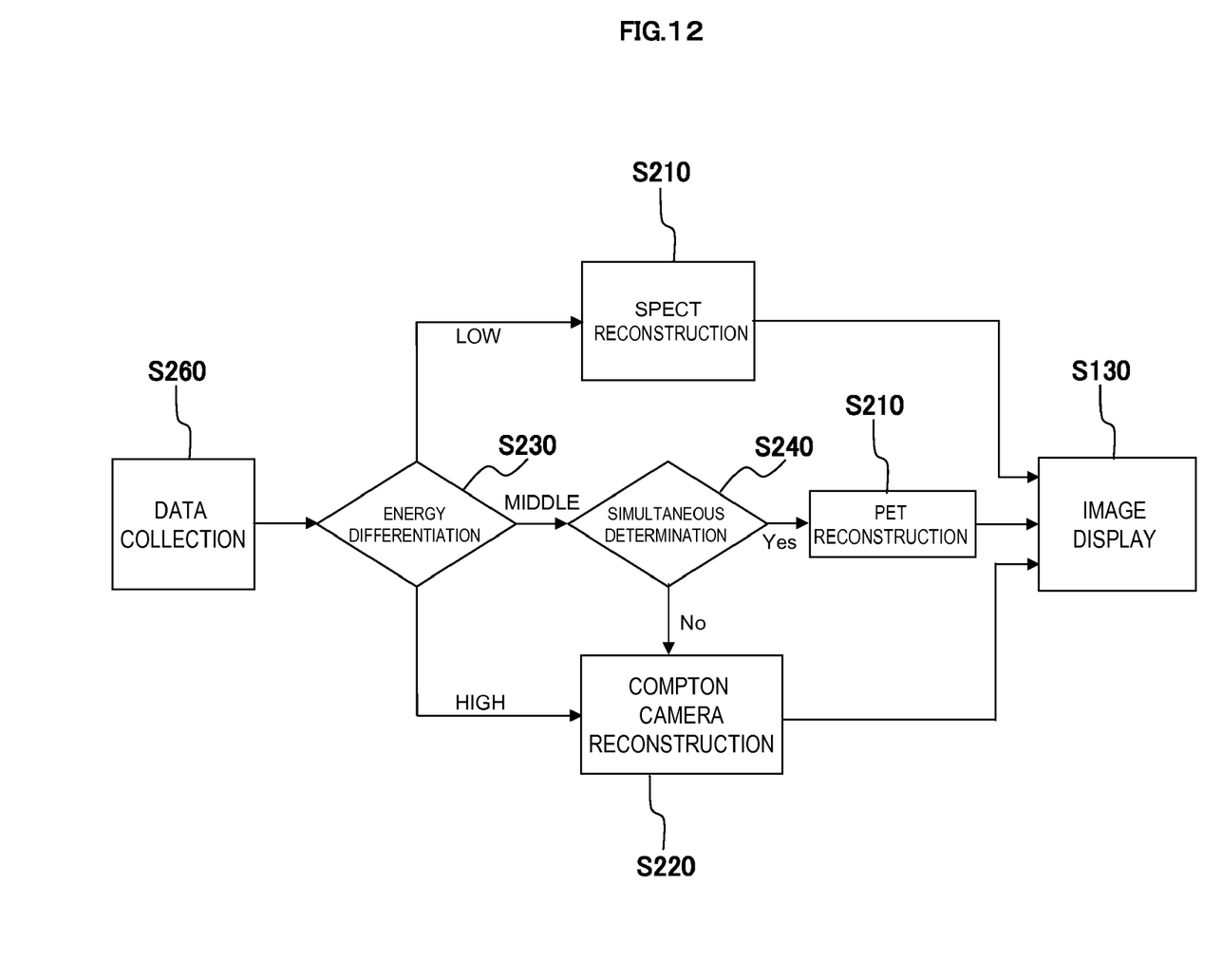
FIG. 12 shows another embodiment of the nuclear medicine diagnosis apparatus by the present invention, and a flow chart showing a procedure to acquire a diagnostic image based on the detection information.

It is needless to say that the configuration shown in FIG. 1 and FIG. 3 can be used in this case of image reconstruction, and SPECT reconstruction (step S201) can be used in the image reconstruction in low energy as shown in FIG. 12 corresponding to FIG. 2.

Accordingly, such configured nuclear medicine diagnosis apparatus is capable of acquiring uniform and high-definition 3-dimensional images over a wide range regardless of energy amount of gamma rays.

In the embodiment illustrated in FIG. 9, the rotation track 610 which is the movement track of the first detection means 100 and the second detection means 100' may be either a circular or an elliptical form.

Figure 10:
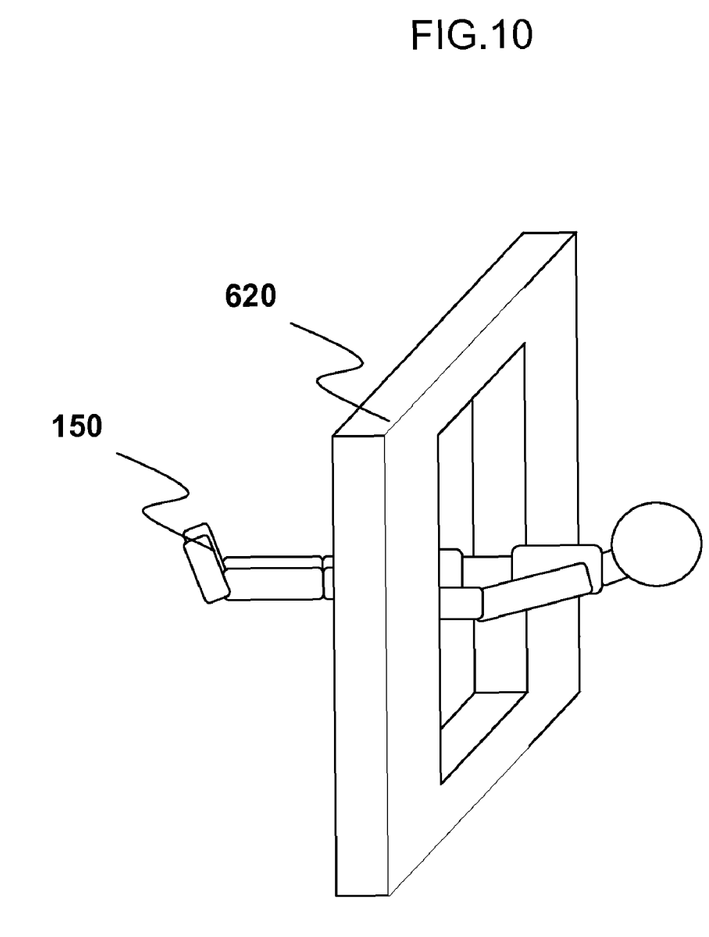
FIG. 10 is a main section configuration diagram showing another embodiment of the nuclear medicine diagnosis apparatus by the present invention.

FIG. 10 is a configuration diagram showing another variation of the nuclear medicine diagnosis apparatus capable of acquiring 3-dimensional images.

The nuclear medicine diagnosis apparatus shown in FIG. 10 illustrates a detection means 620 arranged in the surrounding of the object 150 by circularly encompassing the object. The detection means 620 may have configuration of either having a plurality of divided detectors (not shown) arranged by encompassing the object 150, or having these plurality of detectors as one detector encompassing the object. The point is to arrange the above-described first detection means 100 and the second detection means 100' forming a plurality of pairs encompassing the object 150.

In either case, the detection means 620 can obtain the same detection information as the one obtained from the detection means 620 shown in FIG. 9 by electronic circuit control without having a rotation unit (operation unit) as shown in FIG. 9.

Accordingly, it is possible to create 3-dimensional information from the detection information acquired from the detection means 620.

In this case, the same detection information as the one shown in FIG. 9 can be obtained in a short period of time, imaging time can be saved whereby providing effect of decreasing exposure quantity to the injected drug.

Figure 11:
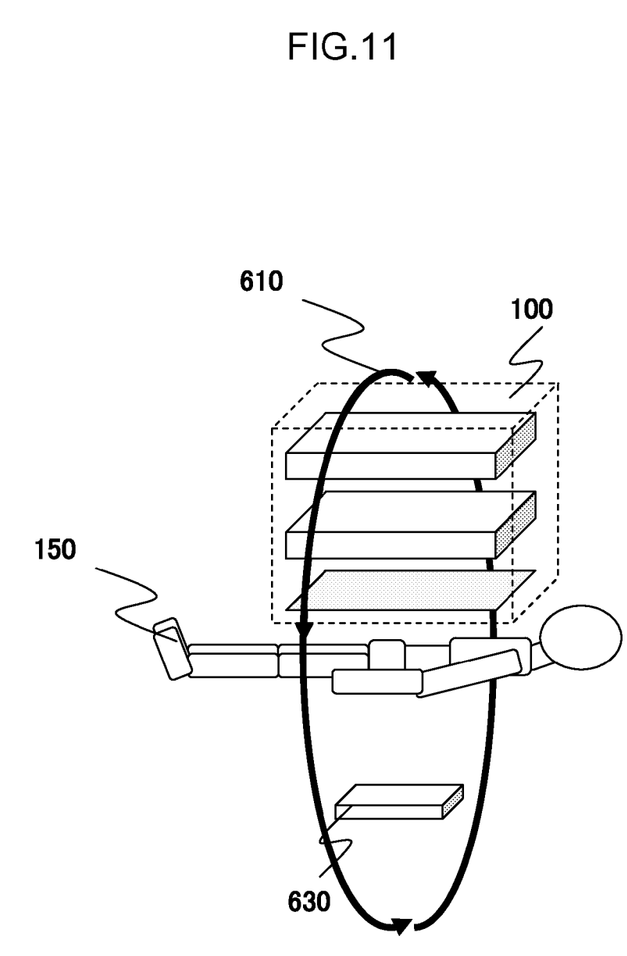
FIG. 11 is a main section configuration diagram showing another embodiment of the nuclear medicine diagnosis apparatus by the present invention.

FIG. 11 is a configuration diagram showing another embodiment of the nuclear medicine diagnosis apparatus related to the present invention, which uses the detection means 630, in the above-mentioned first detection means 100 and the second detection means 100' as, for example, the second detection means 100' having simpler configuration.

The detection means 630 functions only upon collecting the detection information including the direction information of photons from gamma rays detected simultaneously with the first detection means 100, and the detection of information including the direction information on the photons passed through the mechanical collimator and the detection of information including the direction information on the photons performed by the Compton scattering are carried out only by the collection of information from the first detection means 100.

It is needless to say that the first detection means 100 and the detection means 630 of this embodiment can be configured to be placed facing each other and capable of orbiting around the target 150 on a rotation track 610 while maintaining the facing relationship as shown in FIG. 11 so as to acquire 3-dimensional images.

The above-described respective embodiments may be used independently or combined, since the effect in each embodiment can be brought out independently or synergistically.

While preferable embodiments of the medical image display device have been described referring to the attached diagrams, the description therein of specific embodiments is not intended to limit the present invention to the particular forms described. As will be apparent to those skilled in the art, the particular embodiments disclosed above may be altered or modified and all such variations are considered within the scope and spirit of the invention.

The invention claimed is:

1. A nuclear medicine diagnosis apparatus comprising:
   a mechanical collimator having a plurality of through-holes for allowing passage of photons having a predetermined energy emitted from an object to be examined into which a drug containing radioactive isotope is injected or dosed, in a predetermined direction;
   a former-stage detector for detecting positional information at a point of reaction where the photons passing through the mechanical collimator are scattered and energy information on the momentum of charged particles generated by the reaction;

a latter-stage detector disposed in a subsequent stage of the former-stage detector to detect energy information on the photons scattered by the former-stage detector; and image reconstruction means for reconstructing an image from detection information collected from the former-stage detector and the latter-stage detector, wherein the image reconstruction means is configured to differentiate more than three levels of the energy information on the photons passed through the mechanical collimator and the energy information on the photons scattered by the former-stage detector, and perform image reconstruction by different image reconstruction algorithms from individual levels of the differentiated more than three levels of energy information, and wherein the image reconstruction means differentiates the detection energy information into energy information on movement direction of photons passed through the mechanical collimator, energy information on the direction of photons simultaneously detected by the respective detection means, and energy information on direction of photons scattered by Compton scattering.

2. The nuclear medicine diagnosis apparatus according to claim 1, characterized in displaying the images obtained by the image reconstruction means individually in accordance with the energy amount of the photons.

3. The nuclear medicine diagnosis apparatus according to claim 1, characterized in displaying an image obtained by superimposing the images acquired by the image reconstruction means for photons having different energy amount.

4. The nuclear medicine diagnosis apparatus according to claim 1, wherein the image reconstruction means has a plurality of energy windows for differentiating energies with respect to the photons detected based on the rest mass of electrons, and the energy of the photons are differentiated by the respective energy windows.

* * * * *